United States Patent
Bellwood et al.

(10) Patent No.: US 7,756,157 B2
(45) Date of Patent: Jul. 13, 2010

(54) PROVISIONING BANDWIDTH FOR A DIGITAL MEDIA STREAM

(75) Inventors: Thomas A. Bellwood, Austin, TX (US); Robert B. Chumbley, Round Rock, TX (US); Matthew F. Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 11/761,811

(22) Filed: Jun. 12, 2007

(65) Prior Publication Data

US 2008/0310445 A1 Dec. 18, 2008

(51) Int. Cl.
*H04J 3/22* (2006.01)
(52) U.S. Cl. .................................. 370/468; 370/465
(58) Field of Classification Search .................. 370/468
See application file for complete search history.

(56) References Cited

U.S. PATENT DOCUMENTS

| | | |
|---|---|---|
| 2002/0095689 A1 | 7/2002 | Novak |
| 2002/0016619 A1 | 11/2002 | Cristofalo |
| 2003/0005443 A1 | 1/2003 | Axelsson et al. |
| 2004/0179811 A1 | 9/2004 | Kikkawa et al. |
| 2006/0078002 A1 | 4/2006 | Noeldner |
| 2006/0161865 A1 | 7/2006 | Scott et al. |
| 2006/0190970 A1 | 8/2006 | Hellman |
| 2007/0076728 A1* | 4/2007 | Rieger et al. ............... 370/401 |
| 2007/0204313 A1 | 8/2007 | McEnroe et al. |
| 2008/0115182 A1* | 5/2008 | van Willigenburg ......... 725/110 |

OTHER PUBLICATIONS

Office Action Dated Jun. 24, 2009 in U.S. Appl. No. 11/761,817.
Office Action Dated Jul. 22, 2009 in U.S. Appl. No. 11/761,811.
Office Action Dated Aug. 5, 2009 in U.S. Appl. No. 11/761,795.
U.S. Appl. No. 11/761,871, filed Jun. 12, 2007, Rutkowski, et al.
U.S. Appl. No. 11/761,795, filed Jun. 12, 2007, Rutkowski, et al.

* cited by examiner

*Primary Examiner*—Huy D Vu
*Assistant Examiner*—Michael J DiGiovanni
(74) *Attorney, Agent, or Firm*—H. Artoush Ohanian; Justin Dillon; Biggers & Ohanian, LLP.

(57) ABSTRACT

Provisioning bandwidth for a digital media stream, the digital media stream characterized by a bandwidth, including adapting by a media server a first portion of the bandwidth for transmission of the content of a first channel and at least one second, smaller portion of the bandwidth for transmission of the content of at least one second channel; and transmitting, multiplexed together in the digital media stream, by the media server to a media display device, the content of the first channel and the content of the second channel, the content of the second channel transmitted with a lower quality than the content of the first channel.

15 Claims, 5 Drawing Sheets

PROVISIONING BANDWIDTH FOR A DIGITAL MEDIA STREAM

BACKGROUND OF THE INVENTION

1. Field of the Invention

The field of the invention is data processing, or, more specifically, methods, apparatus, and products for provisioning bandwidth for a digital media stream.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in provisioning bandwidth for a digital media stream. The delivery of real-time streamed content to users for viewing entails some special quality of service problems when the user chooses to switch between different content streams. When a user views real-time, live streamed content, it is expected that no significant delay be present in the stream, other than that injected by the broadcaster as a result of regulatory or similar considerations. Significant delays, particularly with regard to delivery of information which may have time based intrinsic value to the viewer, such as sports telecasts, stock market activity, and news, is highly undesirable. In a streamed media solution, content to be viewed is streamed within the allowable bandwidth to the viewer. Using the typical approach, when the viewer chooses to switch channels to a different piece of live content, a constantly pre-buffered stream but with a significant delay is made available to the user. There is also a further switching delay inherent between requests from the client and the content server. These delays make live broadcasts effectively no longer live. A typical television experience, with minimal switching delays, is not currently supportable.

SUMMARY OF THE INVENTION

Methods, apparatus, and products for provisioning bandwidth for a digital media stream, the digital media stream characterized by a bandwidth, are disclosed that include adapting by a media server a first portion of the bandwidth for transmission of the content of a first channel and at least one second, smaller portion of the bandwidth for transmission of the content of at least one second channel; and transmitting, multiplexed together in the digital media stream, by the media server to a media display device, the content of the first channel and the content of the second channel, the content of the second channel transmitted with a lower quality than the content of the first channel.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
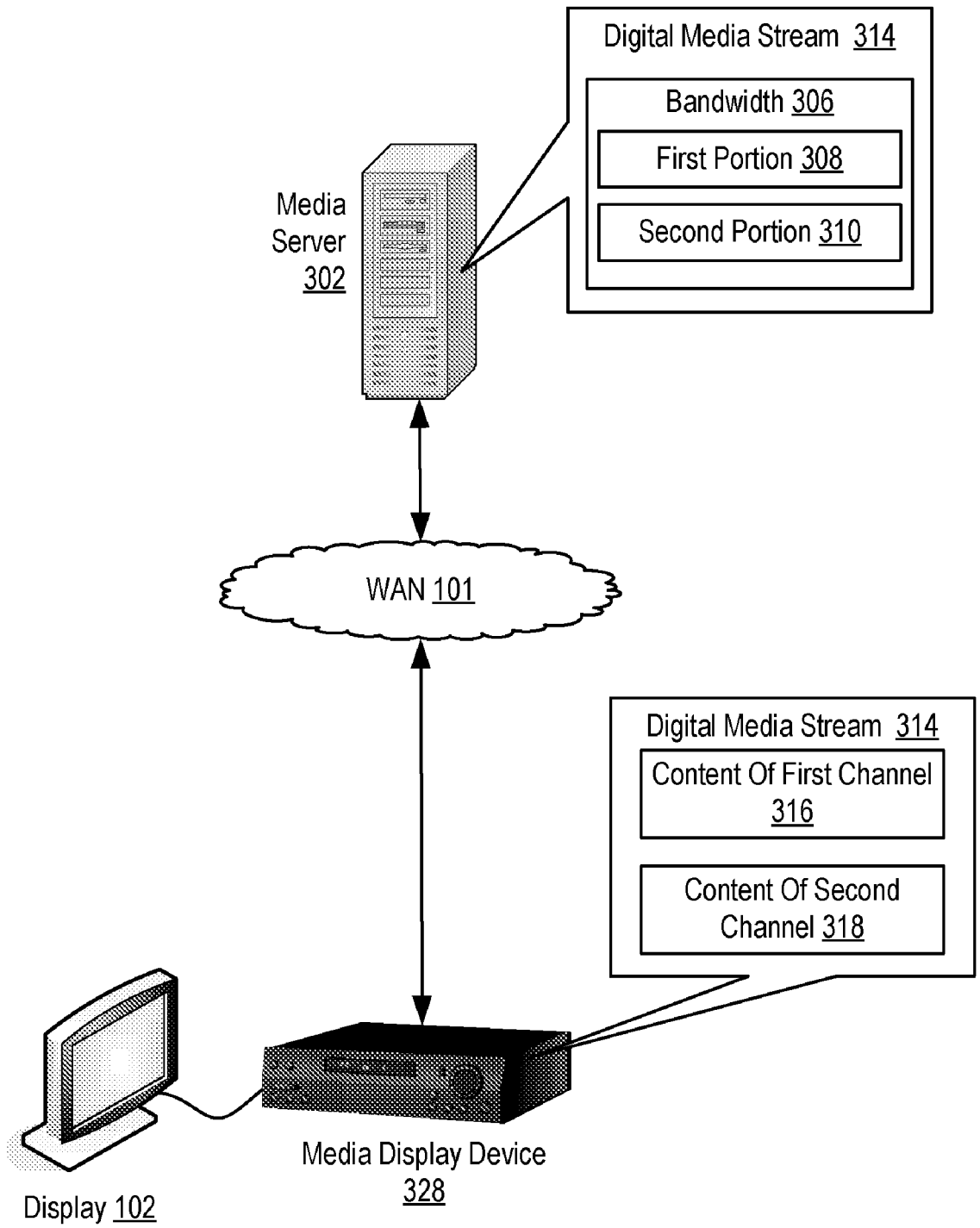
FIG. 1 sets forth a network diagram of a system for provisioning bandwidth for a digital media stream according to embodiments of the present invention.

Exemplary methods, apparatus, and products for provisioning bandwidth for a digital media stream in accordance with the present invention are described with reference to the accompanying drawings, beginning with FIG. 1. FIG. 1 sets forth a network diagram of a system for provisioning bandwidth for a digital media stream according to embodiments of the present invention. A digital media stream is multimedia content that is delivered to a media display device during playback. A media display device is any device capable of multimedia playback. A media display device may be implemented, for example, as a set top box, personal video recorder, or as part of a Digital Television ('DTV'). The digital media stream (314) of FIG. 1 is characterized by a bandwidth (306).

The system of FIG. 1 includes media server (302). A media server is any device that transmits multimedia content. The media server (302) of FIG. 1 adapts a first portion (308) of the bandwidth (306) for transmission of the content (316) of a first channel and at least one second, smaller portion (310) of the bandwidth (306) for transmission of the content (318) of at least one second channel. The exemplary media server of FIG. 1 also transmits, multiplexed together in the digital media stream (314), to a media display device (328), the content (316) of the first channel and the content (318) of the second channel, the content (318) of the second channel transmitted with a lower quality than the content of the first channel. The media server may transmit the content of both channels over any data communications network. In the system of FIG. 1, for example, the media server transmits the content of both channels over the wide area network ('WAN') (101).

The arrangement of servers and other devices making up the exemplary system illustrated in FIG. 1 are for explanation, not for limitation. Data processing systems useful according to various embodiments of the present invention may include additional media servers, media display devices, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), RTP (Real-time Transport Protocol), and RTCP (Real-time Control Protocol), and others as will occur to those of skill in the art. Various embodiments of the present invention may be implemented on a variety of hardware platforms in addition to those illustrated in FIG. 1.

Provisioning bandwidth for a digital media stream in accordance with the present invention is generally implemented with computers, that is, with automated computing machinery. In the system of FIG. 1, for example, the media server and the media display device are implemented to some extent at least as computers. For further explanation, therefore, FIG. 2 sets forth a block diagram of automated computing machinery comprising an exemplary computer (152) configured to operate as a media server in provisioning bandwidth for a digital media stream according to embodiments of the present invention. The computer (152) of FIG. 2 includes at least one computer processor (156) or 'CPU' as well as random access memory (168) ('RAM') which is connected through a system bus (160) to processor (156) and to other components of the computer.

Figure 2:
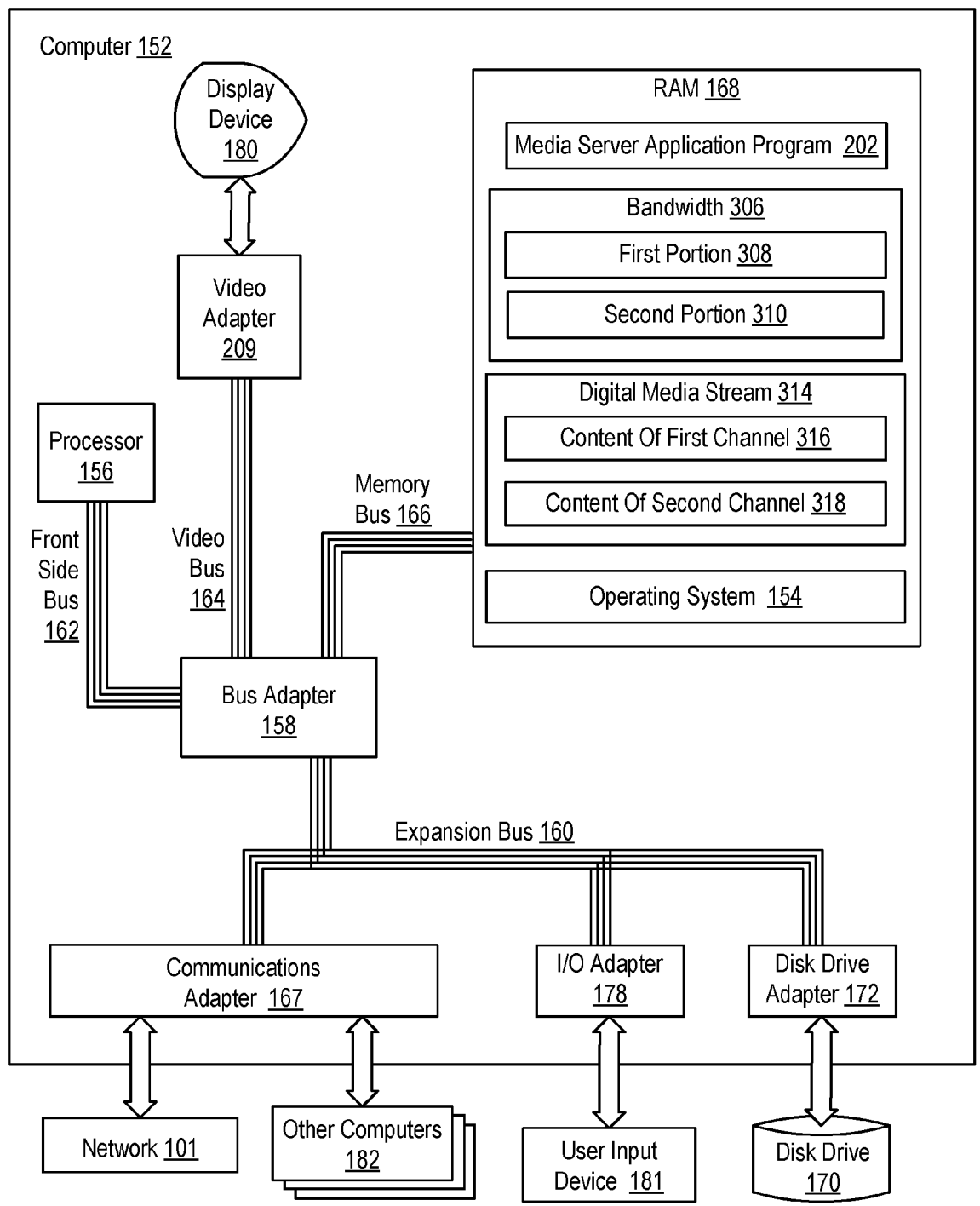
FIG. 2 sets forth a block diagram of automated computing machinery comprising an exemplary computer configured to operate as a media server in provisioning bandwidth for a digital media stream according to embodiments of the present invention.

Stored in RAM (168) is media server application program (202), a module of computer program instructions that causes the computer (152) in the example of FIG. 2 to operate as a media server and provision bandwidth for a digital media stream. The digital media stream (314) of FIG. 2 is characterized by a bandwidth (306). The media server application program (202) may be configured to provision the bandwidth (306) for the digital media stream (314) according to embodiments of the present invention by adapting a first portion (308) of the bandwidth (306) for transmission of the content (316) of a first channel and at least one second, smaller portion (310) of the bandwidth (306) for transmission of the content (318) of at least one second channel. The media server application program (202) may also be configured to transmit, multiplexed together in the digital media stream (314), to a media display device (328), the content (316) of the first channel and the content (318) of the second channel, the content (318) of the second channel transmitted with a lower quality than the content of the first channel.

Also stored in RAM (168) is an operating system (154). Operating systems useful in computers according to embodiments of the present invention include UNIX™, Linux™, Microsoft Vista™, Microsoft XP™, AIX™, IBM's i5/OS™, and others as will occur to those of skill in the art. Operating system (154) and the media server application program (202) in the example of FIG. 2 are shown in RAM (168), but many components of such software typically are stored in non-volatile memory also, for example, on a disk drive (170).

The computer (152) of FIG. 2 includes a bus adapter (158), a computer hardware component that contains drive electronics for the high speed buses, the front side bus (162), the video bus (164), and the memory bus (166), as well as drive electronics for the slower expansion bus (160). Examples of bus adapters useful for provisioning bandwidth for a digital media stream according to embodiments of the present invention include the Intel Northbridge, the Intel Memory Controller Hub, the Intel Southbridge, and the Intel I/O Controller Hub. Examples of expansion buses useful for provisioning bandwidth for a digital media stream according to embodiments of the present invention include Industry Standard Architecture ('ISA') buses and Peripheral Component Interconnect ('PCI') buses.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters in computers implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for provisioning bandwidth for a digital media stream according to embodiments of the present invention include modems for wired dial-up communications, Ethernet (IEEE 802.3) adapters for wired data communications network communications, and 802.11 adapters for wireless data communications network communications.

Figure 3:
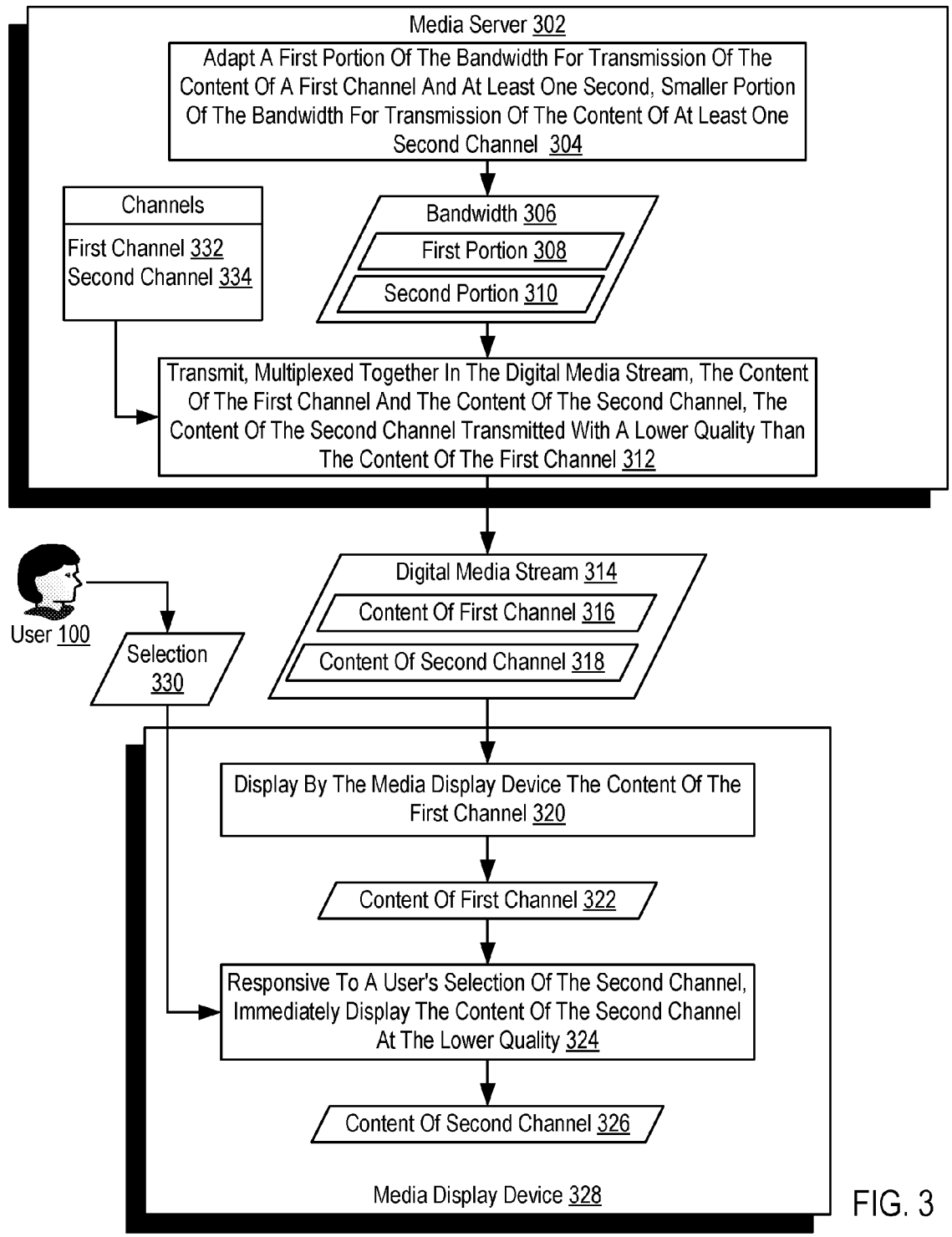
FIG. 3 sets forth a flow chart illustrating an exemplary method for provisioning bandwidth for a digital media stream according to embodiments of the present invention.

For further explanation, FIG. 3 sets forth a flow chart illustrating an exemplary method for provisioning bandwidth for a digital media stream according to embodiments of the present invention. A digital media stream is multimedia content that is delivered to a media playback device during playback. In the method of FIG. 3 for example, the digital media stream may be a VOIP stream or an IPTV stream. VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

IPTV stands for 'Internet Protocol Television,' a generic term for routing digital television content over an IP-based data communications network. The digital television content flows over a general-purpose, packet-switched data communications network, instead of traditional television cables, satellite transmission technology, or terrestrial antennas. IPTV traffic may be deployed on any IP data communications network, including data communications networks lacking a connection to the rest of the Internet, for instance on a private building-wide local area data communications network or 'LAN.'

IPTV content is typically compressed using either a MPEG-2 or a MPEG-4 codec and then sent in an MPEG transport stream delivered via IP Multicast. IP Multicast is a method in which information can be sent to multiple media playback devices at the same time. IPTV may be effected by using Internet Group Management Protocol ('IGMP') to connect to a multicast stream, a digital television channel, and to change from one multicast stream to another. IGMP is the communications protocol used to manage the membership of Internet Protocol multicast groups. IGMP is used by IP hosts and adjacent multicast routers to establish multicast group memberships.

In the method of FIG. 3, the exemplary digital media stream (314) is characterized by a bandwidth (306). Bandwidth is a measure of the amount of information or data that can be sent by a media server to a media display device over a network connection in a given period of time, that is, bandwidth is a measure of data rate. Bandwidth is usually measured in bits per second ('bps'), kilobits per second ('kbps'), or megabits per second ('mbps').

The method of FIG. 3 includes adapting (304) by a media server (302) a first portion (308) of the bandwidth (306) for transmission of the content (316) of a first channel and at least one second, smaller portion (310) of the bandwidth (306) for transmission of the content (318) of at least one second channel. The media server (302) of FIG. 3 is configured with channels (332, 334). Each channel represents a stream of digital media. Although only two channels are depicted in the method of FIG. 3, readers of skill in the art will realize that media servers that provision bandwidth for a digital media stream in accordance with embodiments of the present invention may include any number of channels. A media server may adapt a portion of bandwidth in response to any number of actions, such as a receiving a user request to do so, or receiving an identification of a second channel for Picture-in-Picture use.

Adapting (304) a first portion (308) of the bandwidth (306) for transmission of the content (316) of a first channel (332) and at least one second, smaller portion (310) of the bandwidth (306) for transmission of the content (318) of at least one second channel (334) may be carried out by calculating each portion in dependence upon the bandwidth and a percentage of the bandwidth to dedicate to each channel. If the bandwidth is 1 mbps, for example, and the percentage of the bandwidth to dedicate to the first channel is 80%, then the first portion is 0.8 mbps, and the second portion is 0.2 mbps. Although provisioning bandwidth for a digital media stream is described here with respect to only two channels, one of skill in the art will immediately recognize that any number of channels may be used. If three channels are used, for example, the bandwidth is 1 mbps, and the bandwidth to dedicate to the first channel is 80%, then the remainder of the bandwidth, 0.2 mbps, may be dedicated to the second and third channels. The percentage of bandwidth to dedicate to each channel may be a static value, specified in computer memory in the media server or the percentage may be specified in a profile for each user.

The method of FIG. 3 also includes transmitting (312), multiplexed together in the digital media stream (314), by the media server (302) to a media display device (328), the content (316) of the first channel and the content (318) of the second channel, the content (318) of the second channel transmitted with a lower quality than the content of the first channel. The quality of content is a measure of the data rate at which the content of each channel is transmitted. That is, the higher the data rate, the higher the quality and vice versa. The data rate needed to transmit the content of each channel may be increased or decreased by varying any number of multimedia parameters, including for example, the level of compression of content, the resolution of the content, the sampling rate of the content, and so on as will occur to those of skill in the art. The media server may transmit (312) the content (316) of the first channel and the content (318) of the second channel by decreasing the data rate of the content of the second channel, increasing the data rate of the content of the first channel, or both.

In the method of FIG. 3 transmitting (312) the content of the first channel and the content of the second channel may be carried out by transmitting the content of the first channel and the content of the second channel time division multiplexed in the digital media stream. Multiplexing is a process where multiple digital streams are combined into one signal. Time division multiplexing ('TDM') is a type of digital multiplexing in which two or more signals or bit streams appear to be transferred simultaneously as sub-channels in one communication channel, but are actually, physically taking turns on the channel. The time domain is divided into several recurrent timeslots of fixed length, one for each sub-channel. A sample, byte, or data block of a first sub-channel is transmitted during a first timeslot, a second sub-channel during a second timeslot, and so on. A TDM frame consists of one timeslot for each sub-channel. When the last timeslot for the last sub-channel is transmitted the cycle starts all over again with a new frame, starting with the second sample, byte or data block from the first sub-channel.

As an alternative to TDM, the media server may transmit (312) the content of the first channel and the content of the second channel by transmitting the content of the first channel and the content of the second channel frequency division multiplexed in the digital media stream. Frequency division multiplexing ('FDM') is a type of multiplexing where multiple baseband signals are modulated on different frequency carrier waves and added together to create composite signal. The media server (302) may transmit the content of the first channel and the content of the second channel over a data communications network using the Internet Protocol ('IP').

The method of FIG. 3 also includes displaying (320), by the media display device (328), the content (322) of the first channel. A media display device may be implemented in various forms including for example, a personal computer, a set top box, or other forms as will occur to those of skill in the art. The media display device (328) may display (320) the content (322) of the first channel by de-multiplexing the digital media stream (314) to recover the contents of each channel, creating a buffer for each channel, and accessing the buffer created for the first channel. The media display device may display the contents of the first channel on any display, such as a monitor, television, or others as will occur to those of skill in the art.

The method of FIG. 3 also includes, responsive to a user's (100) selection (330) of the second channel, immediately displaying (324), by the media display device (328), the content (326) of the second channel at the lower quality. A user (100) may make a selection by using any number of user input devices, such as, for example, a mouse, keyboard, remote control, or buttons on the media display device dedicated for such selection. The term 'immediately' is used to describe the speed at which the media display device is capable of ceasing display of the content of the first channel and initiating display of the content of the second channel. Here, 'immediately' means without significant delay, that is, the contents of the second channel are displayed at, or very near, the time the user selects the second channel. The media display device (328) may immediately display (324) the content (326) of the second channel at the lower quality by accessing the buffer created for the second channel.

Figure 4:
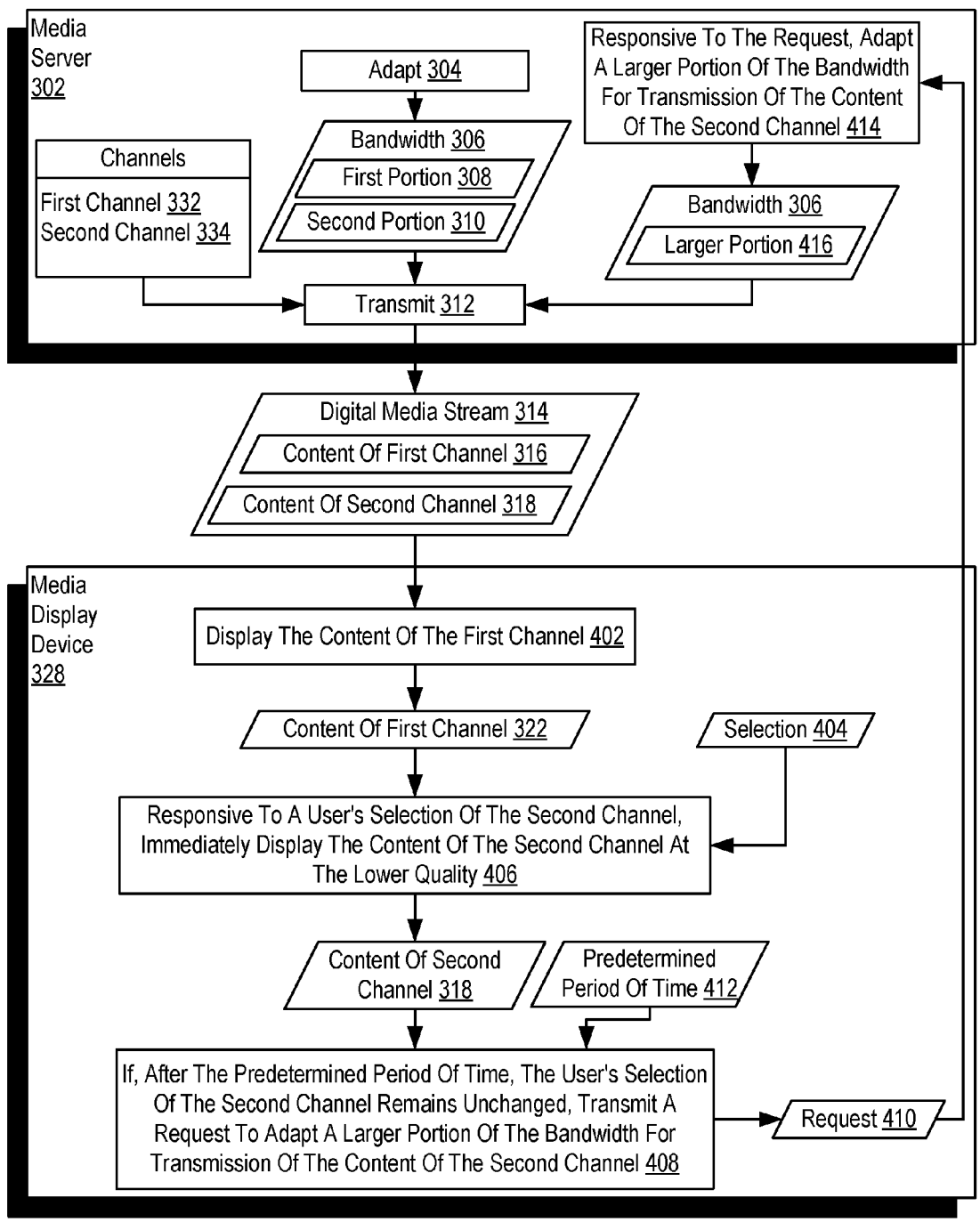
FIG. 4 sets forth a flow chart illustrating a further exemplary method for provisioning bandwidth for a digital media stream according to embodiments of the present invention.

For further explanation, FIG. 4 sets forth a flow chart illustrating a further exemplary method for provisioning bandwidth for a digital media stream according to embodiments of the present invention. The method of FIG. 4 is similar to the method of FIG. 3, including, as it does, the media server's (302) adapting (304) a first portion (308) of the bandwidth (306) for transmission of the content (316) of a first channel and at least one second, smaller portion (310) of the bandwidth (306) for transmission of the content (318) of at least one second channel, and the media server's (302) transmitting (312) the content (316) of the first channel and the content (318) of the second channel, all of which operate in a similar manner as described above.

The method of FIG. 4, however, includes displaying (402) by the media display device (328) the content (322) of the first channel and responsive to a user's selection (404) of the second channel, immediately displaying (406) the content (318) of the second channel at the lower quality. If, after a predetermined period of time (412), the user's selection (404) of the second channel remains unchanged, the media display device (328) transmits (408), by the media display device (328) to the media server (302) a request (410) to adapt a larger portion (416) of the bandwidth (306) for transmission of the content (318) of the second channel. The predetermined period of time (412) may be a value specified by a user or a static value stored in computer memory in the media display device. The media display device (328) may transmit a request to the media server (302) through any data communications protocol, including for example, TCP (Transmission Control Protocol), IP (Internet Protocol), HTTP (Hyper-Text Transfer Protocol), WAP (Wireless Access Protocol), HDTP (Handheld Device Transport Protocol), RTP (Real-time Transport Protocol), and RTCP (Real-time Control Protocol), and others as will occur to those of skill in the art.

Responsive to the request (410), the media server adapts (414) a larger portion (416) of the bandwidth (306) for transmission of the content (318) of the second channel. The media server may adapt the larger portion of the bandwidth by calculating the larger portion in dependence upon the bandwidth and a percentage of the bandwidth to dedicate to a channel after the predetermined period of time. The percentage of the bandwidth to dedicate to a channel after the predetermined period of time may be specified, by a user, in a user profile stored by the media server, or may be a static value specified in computer memory in the media server.

Figure 5:
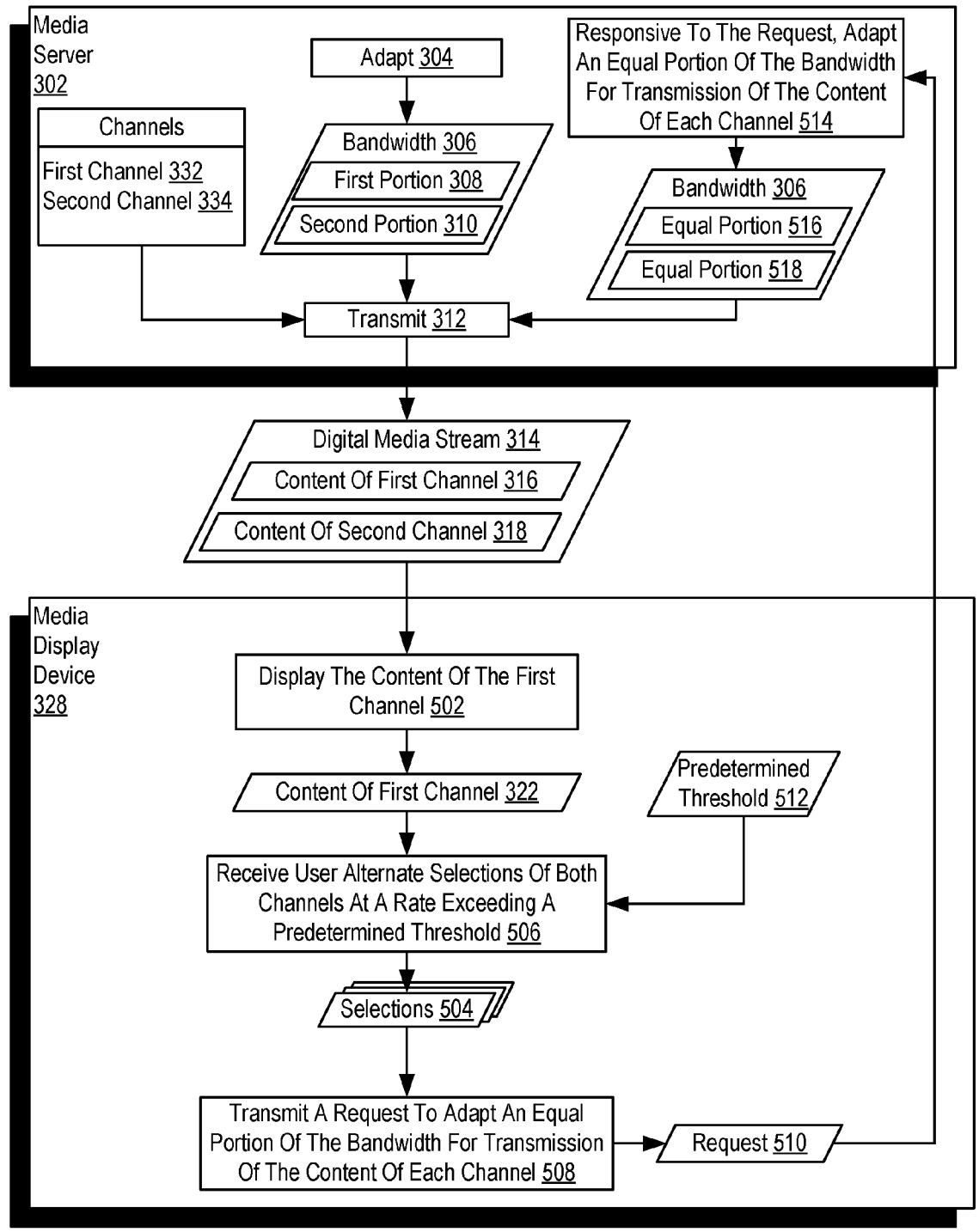
FIG. 5 sets forth a flow chart illustrating a further exemplary method for provisioning bandwidth for a digital media stream according to embodiments of the present invention.

For further explanation, FIG. 5 sets forth a flow chart illustrating a further exemplary method for provisioning bandwidth for a digital media stream according to embodiments of the present invention. The method of FIG. 5 is similar to the method of FIG. 3, including, as it does, the media server's (302) adapting (304) a first portion (308) of the bandwidth (306) for transmission of the content (316) of a first channel and at least one second, smaller portion (310) of the bandwidth (306) for transmission of the content (318) of at least one second channel, and the media server's (302) transmitting (312) the content (316) of the first channel and the content (318) of the second channel, all of which operate in a similar manner as described above.

The method of FIG. 5, however, includes displaying (502) by the media display device (328) the content (322) of the first channel, and receiving (506) by the media display device (328) user alternate selections (504) of both channels at a rate exceeding a predetermined threshold (512). A user may alternately select each channel, that is, a user may select the first channel, then the second channel, then the first channel, and so on. A user may, for example, select a channel carrying a football game, then a channel carrying a golf tournament, then the channel carrying the football game, and so on in a cycle. The user may continue this cycle of selections at a rate, such as for example, 3 selections per minute, which exceeds a predetermined threshold.

When the user alternately selects (504) of both channels at a rate exceeding a predetermined threshold (512), the media display device (328) transmits (508), to the media server (302), a request (510) to adapt an equal portion (516, 518) of the bandwidth (306) for transmission of the content (316, 318) of each channel. The media display device may transmit (508) a request to adapt an equal portion of the bandwidth for transmission of the content of each channel through any data communications protocol including for example, RTP, TCP, IP, HTTP, WAP, HDTP, and others as will occur to those of skill in the art.

In response to the request (510), the media server adapts (514) an equal portion (516, 518) of the bandwidth (306) for transmission of the content (316, 318) of each channel. The media server may adapt (514) an equal portion (516, 518) of the bandwidth (306) for transmission of the content (316, 318) of each channel by calculating each portion (316, 318) in dependence upon the bandwidth. For two channels the each portion will be half of the bandwidth, for three each will be a third of the bandwidth, and so on.

Exemplary embodiments of the present invention are described largely in the context of a fully functional computer system for provisioning bandwidth for a digital media stream. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of provisioning bandwidth for a digital media stream, the digital media stream characterized by a bandwidth, the method comprising:

adapting by a media server a first portion of the bandwidth for transmission of the content of a first channel and at least one second, smaller portion of the bandwidth for transmission of the content of at least one second channel;

transmitting, multiplexed together in the digital media stream, by the media server to a media display device, the content of the first channel and the content of the second channel, the content of the second channel transmitted with a lower quality than the content of the first channel;

displaying by the media display device the content of the first channel;

receiving by the media display device user alternate selections of both channels at a rate exceeding a predetermined threshold; and responsive to receiving user alternate selections of both channels at a rate exceeding a predetermined threshold, transmitting, by the media display device to the media server, a request to adapt an equal portion of the bandwidth for transmission of the content of each channel, and responsive to the request, adapting by the media server an equal portion of the bandwidth for transmission of the content of each channel.

2. The method of claim 1 further comprising:

displaying, by the media display device, the content of the first channel; and responsive to a user's selection of the second channel, immediately displaying, by the media display device, the content of the second channel at the lower quality.

3. The method of claim 1 further comprising:

displaying by the media display device the content of the first channel;

responsive to a user's selection of the second channel, immediately displaying the content of the second channel at the lower quality;

if, after a predetermined period of time, the user's selection of the second channel remains unchanged, transmitting, by the media display device to the media server a request to adapt a larger portion of the bandwidth for transmission of the content of the second channel, and responsive to the request, adapting by the media server a larger portion of the bandwidth for transmission of the content of the second channel.

4. The method of claim 1 wherein the digital media stream further comprises a VOW stream.

5. The method of claim 1 wherein the digital media stream further comprises an IPTV stream.

6. Apparatus for provisioning bandwidth for a digital media stream, the digital media stream characterized by a bandwidth, the apparatus comprising a computer processor, a computer memory operatively coupled to the computer processor, the computer memory having disposed within it computer program instructions capable of:

adapting by a media server a first portion of the bandwidth for transmission of the content of a first channel and at least one second, smaller portion of the bandwidth for transmission of the content of at least one second channel;

transmitting, multiplexed together in the digital media stream, by the media server to a media display device, the content of the first channel and the content of the second channel, the content of the second channel transmitted with a lower quality than the content of the first channel;

displaying by the media display device the content of the first channel;

receiving by the media display device user alternate selections of both channels at a rate exceeding a predetermined threshold; and responsive to receiving user alternate selections of both channels at a rate exceeding a predetermined threshold, transmitting, by the media display device to the media server, a request to adapt an equal portion of the bandwidth for transmission of the content of each channel, and responsive to the request, adapting by the media server an equal portion of the bandwidth for transmission of the content of each channel.

7. The apparatus of claim 6 further comprising computer program instructions capable of:

displaying, by the media display device, the content of the first channel; and responsive to a user's selection of the second channel, immediately displaying, by the media display device, the content of the second channel at the lower quality.

8. The apparatus of claim 6 further comprising computer program instructions capable of:

displaying by the media display device the content of the first channel;

responsive to a user's selection of the second channel, immediately displaying the content of the second channel at the lower quality;

if, after a predetermined period of time, the user's selection of the second channel remains unchanged, transmitting, by the media display device to the media server a request to adapt a larger portion of the bandwidth for transmission of the content of the second channel, and responsive to the request, adapting by the media server a larger portion of the bandwidth for transmission of the content of the second channel.

9. The apparatus of claim 6 wherein the digital media stream further comprises a VOIP stream.

10. The apparatus of claim 6 wherein the digital media stream further comprises an IPTV stream.

11. A computer program product for provisioning bandwidth for a digital media stream, the digital media stream characterized by a bandwidth, the computer program product disposed in a computer readable, recordable medium, the computer program product comprising computer program instructions capable of: adapting by a media server a first portion of the bandwidth for transmission of the content of a first channel and at least one second, smaller portion of the bandwidth for transmission of the content of at least one second channel;

transmitting, multiplexed together in the digital media stream, by the media server to a media display device, the content of the first channel and the content of the second channel, the content of the second channel transmitted with a lower quality than the content of the first channel;

displaying by the media display device the content of the first channel;

receiving by the media display device user alternate selections of both channels at a rate exceeding a predetermined threshold; and responsive to receiving user alternate selections of both channels at a rate exceeding a predetermined threshold, transmitting, by the media display device to the media server, a request to adapt an equal portion of the bandwidth for transmission of the content of each channel, and responsive to the request, adapting by the media server an equal portion of the bandwidth for transmission of the content of each channel.

12. The computer program product of claim 11 further comprising computer program instructions capable of:

displaying, by the media display device, the content of the first channel; and responsive to a user's selection of the second channel, immediately displaying, by the media display device, the content of the second channel at the lower quality.

13. The computer program product of claim 11 further comprising computer program instructions capable of:

displaying by the media display device the content of the first channel;

responsive to a user's selection of the second channel, immediately displaying the content of the second channel at the lower quality;

if, after a predetermined period of time, the user's selection of the second channel remains unchanged, transmitting, by the media display device to the media server a request to adapt a larger portion of the bandwidth for transmission of the content of the second channel, and responsive to the request, adapting by the media server a larger portion of the bandwidth for transmission of the content of the second channel.

14. The computer program product of claim 11 wherein the digital media stream further comprises a VOIP stream.

15. The computer program product of claim 11 wherein the digital media stream further comprises an IPTV stream.

* * * * *